(12) United States Patent
You et al.

(10) Patent No.: US 9,081,258 B2
(45) Date of Patent: Jul. 14, 2015

(54) FLASH LENS AND FLASH MODULE EMPLOYING THE SAME (71) Applicant: SAMSUNG ELECTRONICS CO., LTD., Suwon-Si (KR)

(72) Inventors: Jae-sung You, Gyeonggi-do (KR); Cheon-ho Park, Gyeonggi-do (KR); Sung-kyong Oh, Gyeonggi-do (KR); Kwan-young Oh, Gyeonggi-do (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/178,002

(22) Filed: Feb. 11, 2014

(65) Prior Publication Data

US 2014/0226299 A1 Aug. 14, 2014

Related U.S. Application Data (63) Continuation of application No. 13/272,683, filed on Oct. 13, 2011, now Pat. No. 8,687,954.

(30) Foreign Application Priority Data

Nov. 10, 2010 (KR) .................. 10-2010-0111564

(51) Int. Cl.
*G03B 15/05* (2006.01)
*G03B 15/03* (2006.01)
(Continued)

(52) U.S. Cl.
CPC ............. *G03B 15/03* (2013.01); *F21V 13/04* (2013.01); *G02B 3/08* (2013.01); *G02B 19/0028* (2013.01); *G02B 19/0061* (2013.01); *G03B 15/05* (2013.01); *G03B 2215/0503* (2013.01)

(58) Field of Classification Search
CPC ........................................................ G03B 15/05
USPC ........................................................ 396/176
See application file for complete search history.

(56) References Cited

U.S. PATENT DOCUMENTS 5,404,869 A * 4/1995 Parkyn et al. ................. 126/699
5,884,104 A * 3/1999 Chase et al. ...................... 396/6
(Continued)

FOREIGN PATENT DOCUMENTS

CN 1836183 A 9/2006
CN 101430063 A 5/2009
(Continued)

OTHER PUBLICATIONS

Sharp Kabushiki Kaisha, PCT/JP2010/061710, International Search Report, Oct. 8, 2010.*
(Continued)

*Primary Examiner* — Clayton E LaBalle
*Assistant Examiner* — Kevin Butler
(74) *Attorney, Agent, or Firm* — McDermott Will & Emery LLP (57) ABSTRACT

A flash lens and a flash module employing the same. The flash lens includes a lens unit including an incident surface, a reflecting surface, and a light-emitting surface; and a lens seating portion disposed at a lower portion of an edge of the light-emitting surface, extending and protruding from the reflecting surface, and including a pattern formed in a lower surface thereof. In addition, the flash module according to an embodiment of the present invention may include the flash lens and a light emitting diode (LED) chip integrally formed with the flash lens.

12 Claims, 7 Drawing Sheets

(51) Int. Cl.
*G02B 3/08* (2006.01)
*G02B 19/00* (2006.01)
*F21V 13/04* (2006.01)

(56) References Cited

U.S. PATENT DOCUMENTS

| | | | | |
|---|---|---|---|---|
| 6,088,540 | A * | 7/2000 | Leidig et al. | 396/155 |
| 6,088,543 | A * | 7/2000 | Kaji et al. | 396/176 |
| 6,598,998 | B2 * | 7/2003 | West et al. | 362/307 |
| 6,607,286 | B2 * | 8/2003 | West et al. | 362/255 |
| 6,850,375 | B2 * | 2/2005 | Tenmyo | 359/831 |
| 6,898,026 | B2 | 5/2005 | Jewers et al. | |
| 7,222,995 | B1 | 5/2007 | Bayat et al. | |
| 7,379,117 | B2 * | 5/2008 | Hwang | 348/371 |
| 7,502,558 | B2 * | 3/2009 | Kim et al. | 396/155 |
| 7,817,909 | B2 * | 10/2010 | Montgomery et al. | 396/62 |
| 7,983,552 | B2 * | 7/2011 | Moon et al. | 396/155 |
| 8,251,547 | B2 | 8/2012 | Yamaguchi | |
| 8,301,024 | B2 * | 10/2012 | Mather et al. | 396/176 |
| 8,436,391 | B2 * | 5/2013 | Tran et al. | 257/99 |
| 8,687,954 | B2 * | 4/2014 | You et al. | 396/176 |
| 2004/0080835 | A1 | 4/2004 | Chinniah et al. | |
| 2004/0189933 | A1 | 9/2004 | Sun et al. | |
| 2005/0088758 | A1 * | 4/2005 | Minano et al. | 359/726 |
| 2006/0055818 | A1 * | 3/2006 | Hwang | 348/371 |
| 2009/0052192 | A1 * | 2/2009 | Kokubo et al. | 362/311.09 |
| 2009/0116245 | A1 | 5/2009 | Yamaguchi | |
| 2009/0122515 | A1 * | 5/2009 | Oon et al. | 362/84 |
| 2010/0061105 | A1 * | 3/2010 | Shyu et al. | 362/311.02 |
| 2010/0150200 | A1 * | 6/2010 | Ho et al. | 372/50.23 |
| 2010/0178046 | A1 * | 7/2010 | Moon et al. | 396/155 |
| 2011/0038028 | A1 * | 2/2011 | Dharmatilleke | 359/290 |
| 2012/0114323 | A1 * | 5/2012 | You et al. | 396/176 |
| 2012/0176801 | A1 * | 7/2012 | You | 362/311.02 |
| 2012/0182710 | A1 * | 7/2012 | Lee et al. | 362/17 |
| 2013/0003342 | A1 * | 1/2013 | You | 362/17 |
| 2014/0226299 | A1 * | 8/2014 | YOU et al. | 362/16 |

FOREIGN PATENT DOCUMENTS

| | | | | |
|---|---|---|---|---|
| CN | 201373329 Y | | 12/2009 | |
| JP | WO2011007733 | * | 1/2011 | F21S 2/00 |
| KR | 10-2008-0022698 A | | 3/2008 | |
| KR | 10-2008-0097912 A | | 11/2008 | |
| WO | 2011/007733 A | | 1/2011 | |

OTHER PUBLICATIONS

Extended European Search Report issued in European Patent Application No. 11 188 567.9, dated Dec. 20, 2011.
Chinese Office Action dated Sep. 15, 2014 issued in Chinese Patent Application No. 201110372593.0 (English translation).
Chinese Second Office Action issued in Chinese Application No. 201110372593.0 dated Apr. 3, 2015, with English Translation.

* cited by examiner

FLASH LENS AND FLASH MODULE EMPLOYING THE SAME

CROSS-REFERENCE TO RELATED APPLICATIONS

This application is a continuation of U.S. patent application Ser. No. 13/272,683, filed on Oct. 13, 2011, which claims the benefit of Korean patent application Ser. No. 10-2010-0111564, filed on Nov. 10, 2010, the disclosures of which are incorporated herein by reference in their entirety.

BACKGROUND

1. Field

The present disclosure relates to a flash lens and a flash module employing the same, and more particularly, to a flash lens in which a pattern is formed in a lens seating portion in order to reduce a loss of light in the flash lens, and a flash module employing the flash lens.

2. Description of the Related Art

Camera flashes are apparatuses used to provide light when an amount of light is not sufficient during photographing or when an auxiliary light source is necessary. A camera flash may include a light source unit and a lens unit. The light source unit may use xenon or a light-emitting diode (LED), and the lens unit may use plastic or glass. Recently, most small electronic apparatuses may have a small camera embedded therein, and such a small camera needs a flash in order to provide a sufficient amount of light during photographing. The flash needs to be made thinner in order to be embedded in the small electronic apparatus. Thus, in order for such a thin flash to effectively provide a sufficient amount of light to an image capture area, research on a flash lens is actively being conducted.

SUMMARY

Provided is a flash lens in which a pattern is formed in a lens seating portion in order to reduce a loss of light in the flash lens, and a flash module employing the flash lens.

Additional aspects will be set forth in part in the description which follows and, in part, will be apparent from the description, or may be learned by practice of the presented embodiments.

According to an aspect of the present invention, a flash lens includes a lens unit including an incident surface, a reflecting surface, and a light-emitting surface; and a lens seating portion disposed at a lower portion of an edge of the light-emitting surface, extending and protruding from the reflecting surface, and including a pattern formed in a lower surface thereof.

The pattern has a plurality of basic shapes repeatedly formed.

The pattern reflects light incident on the lens seating portion toward the light-emitting surface.

The lens seating portion has any one shape selected from the group consisting of a rectangular shape, a square shape, a circular shape, and an oval shape.

A cross section of the basic shape has any one shape selected from the group consisting of a triangular shape and a semicircular shape.

The plurality of basic shapes have the same size.

As the distance between the basic shape and the reflecting surface increases, the basic shape becomes larger.

According to another aspect of the present invention, a flash module including: the flash lens; and a light emitting diode (LED) chip integrally formed with the flash lens.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Various example embodiments will now be described more fully with reference to the accompanying drawings in which some example embodiments are shown.

Detailed illustrative example embodiments are disclosed herein. However, specific structural and functional details disclosed herein are merely representative for purposes of describing example embodiments. This invention may, however, may be embodied in many alternate forms and should not be construed as limited to only the example embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms 'first', 'second', etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element or layer is referred to as being "formed on," another element or layer, it can be directly or indirectly formed on the other element or layer. That is, for example, intervening elements or layers may be present. In contrast, when an element or layer is referred to as being "directly formed on," to another element, there are no intervening elements or layers present. Other words used to describe the relationship between elements or layers should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In the drawings, the thicknesses of layers and regions are exaggerated for clarity. Like reference numerals in the drawings denote like elements.

Figure 1A:
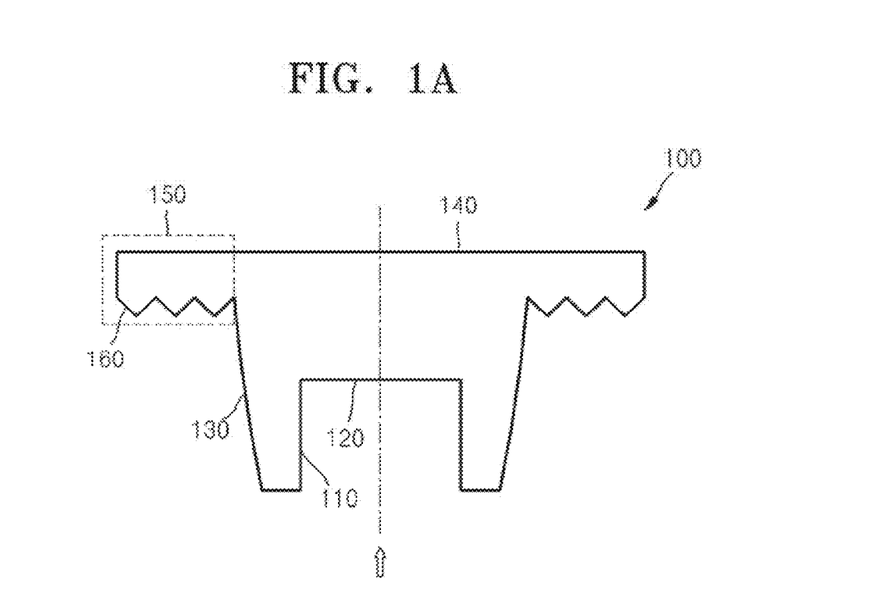
FIG. 1A is a schematic cross-sectional view illustrating a flash lens according to an embodiment of the present invention.
Figure 1B:
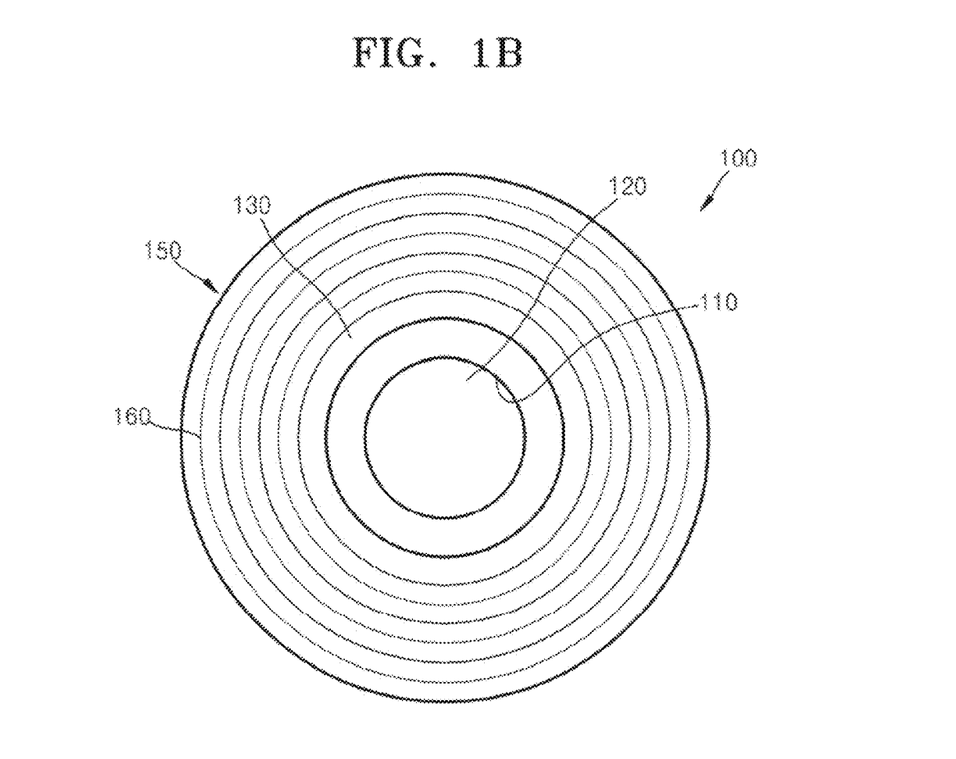
FIG. 1B is a plane view thereof.

FIG. 1A is a schematic cross-sectional view illustrating a flash lens 100, according to an embodiment of the present invention, and FIG. 1B is a plane view thereof taken along an arrow direction of FIG. 1A.

Referring to FIG. 1A, the flash lens 100 of the current embodiment may include a lens unit including first and second incident surfaces 120 and 110, a reflecting surface 130, and light-emitting surface 140, and a lens seating portion 150 disposed at a lower portion of an edge of the light-emitting surface 140, extending and protruding from the reflecting surface 130, and including a pattern 160 formed in a lower surface thereof.

The lens unit may include the first and second incident surfaces 120 and 110 on which light emitted from a light-emitting device formed at a lower portion of the flash lens 100 is incident. The incident surfaces may include the first incident surface 120 on which light is incident in a center direction of the flash lens 100 from the light-emitting device, and the second incident surface 110 on which light is incident in a lateral direction of the flash lens 100 from the light-emitting device. However, the incident surfaces are not limited thereto, and any of various incident surfaces may be used.

The lens unit may also include the reflecting surface 130 for reflecting light incident on the second incident surface 110 toward the light-emitting surface 140. The reflecting surface 130 may reflect light incident on the second incident surface 110 in a lateral direction of the flash lens 100 from a light-emitting device chip to emit the light to the light-emitting surface 140. Also, the reflecting surface 130 may reflect light reflected at the first incident surface 120, and incident on the second incident surface 110 toward the light-emitting surface 140. Meanwhile, the reflecting surface 130 may totally reflect light toward the light-emitting surface 140.

In addition, the lens unit may include the light-emitting surface 140. The light-emitting surface 140 may emit light incident on the first and second incident surfaces 120 and 110 of the lens unit out of the flash lens 100. That is, the light-emitting surface 140 may emit light incident on the first incident surface 120 and light incident on the second incident surface 110 and reflected at the reflecting surface 130 out of the flash lens 100. Also, the light-emitting surface 140 may emit light reflected at the first incident surface 120, and incident on the second incident surface 110, and reflected at the reflecting surface 130 out of the flash lens 100.

The lens seating portion 150 may be disposed at the lower portion of the edge of the light-emitting surface 140, and may extend and protrude from the reflecting surface 130. The pattern 160 may be formed in the lower surface of the lens seating portion 150 and may reflect light incident on the lens seating portion 150 toward the light-emitting surface 140. In a conventional flash lens formed of a silicon resin and not having a frame, the silicon resin has a low hardness, and thus the conventional flash lens requires a thick lens seating portion, for example, a lens seating portion having a thickness of about 0.3 mm. The lens seating portion functions as a light guide plate, and thus, light is lost through the lens seating portion. However, the flash lens 100 of the current embodiment may reflect light incident on the lens seating portion 150 at the pattern 160 formed in the lower surface thereof toward the light-emitting surface 140, thereby preventing light from being lost in the lens seating portion 150 and increasing illuminance of a peripheral portion of the flash lens 100 compared to a center portion of the flash lens 100.

The pattern 160 may have a plurality of basic shapes formed repeatedly. As illustrated in FIG. 1A, a cross section of a basic shape has an equilateral triangle, such as a prism, but the present invention is not limited thereto, and the basic shape may have any of various shapes. That is, the cross section of the basic shape for forming the pattern 160 may have a polygonal shape, such as a triangle, a quadrangle, or the like, but may have a semicircular shape, a sine wave shape, or the like. Also, the pattern 160 may have a plurality of basic shapes having the same size. That is, the cross section of the pattern 160 may have a shape in which triangles having the same size are regularly arranged. Also, the flash lens 100 of the current embodiment may be formed of a silicon resin, and thus, may have a higher degree of precision than a plastic lens.

Referring to FIG. 1B, the lens unit has a circular shape. That is, the first incident surface 120, the light-emitting surface 140, and the like may be formed in a circular shape. However, the present invention is not limited thereto. In addition, the lens seating portion 150, in the view taken along the arrow direction illustrated in FIG. 1A, has a circular shape, but the present invention is not limited thereto, and the lens seating portion 150 may have any of various shapes. A plane of the pattern 160 may have a shape in which a plurality of concentric circles are regularly arranged, that is, a shape in which a plurality of circles are arranged around the lens unit so as to become larger at a predetermined ratio.

Figure 2A:
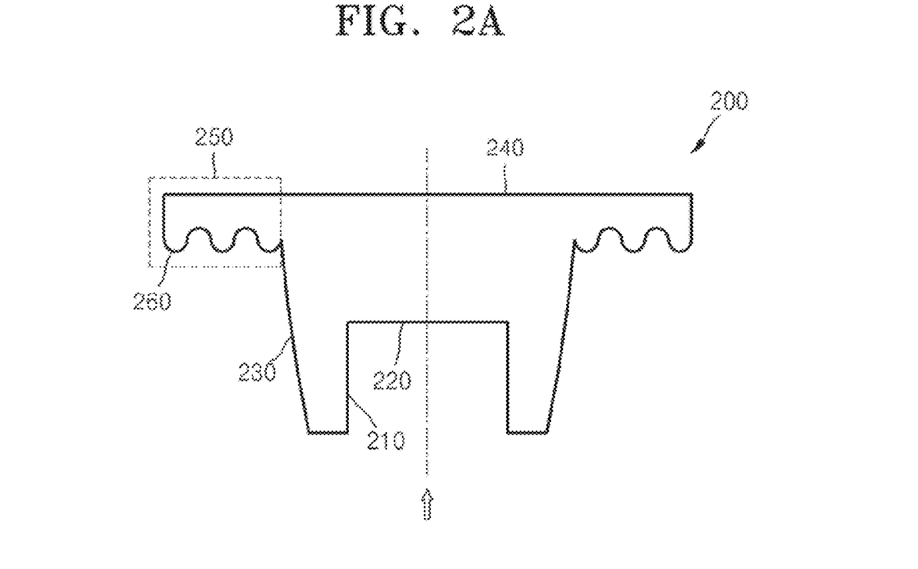
FIG. 2A is a schematic cross-sectional view illustrating a flash lens according to another embodiment of the present invention.
Figure 2B:
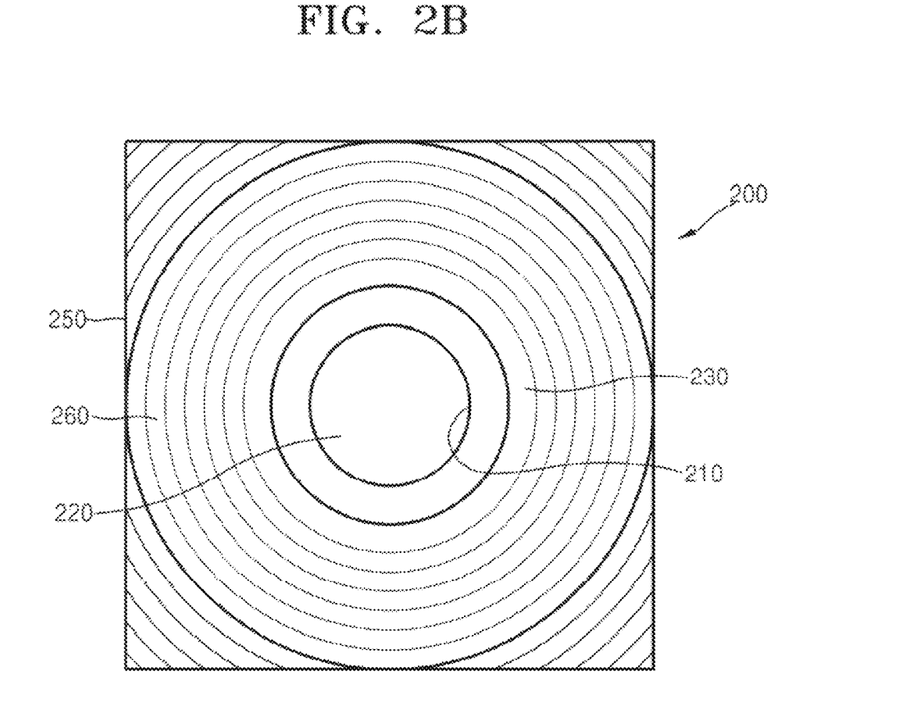
FIG. 2B is a plane view thereof.

FIG. 2A is a schematic cross-sectional view illustrating a flash lens 200 according to another embodiment of the present invention, and FIG. 2B is a plane view thereof taken along an arrow direction of FIG. 2A. Hereinafter, differences between the flash lens 100 of FIGS. 1A and 1B and the flash lens 200 of FIGS. 2A and 2B will be mainly described.

Referring to FIG. 2A, the flash lens 200 of the current embodiment may include a lens unit including first and second incident surfaces 220 and 210, a reflecting surface 230, and a light-emitting surface 240, and a lens seating portion 250 disposed at a lower portion of an edge of the light-emitting surface 240, extending and protruding from the reflecting surface 230, and including a pattern 260 formed in a lower surface thereof. The first and second incident surfaces 220 and 210, the reflecting surface 230, and the light-emitting surface 240 included in the lens unit respectively are as those described in the embodiment with regard to FIGS. 1A and 1B.

The lens seating portion 250 may be disposed at the lower portion of the edge of the light-emitting surface 240, and may extend and protrude from the reflecting surface 230. The pattern 260 may be formed in the lower surface of the lens seating portion 250 and may reflect light incident on the lens seating portion 250 toward the light-emitting surface 240, thereby preventing light from being lost in a conventional lens seating portion of a flash lens not having a frame and increasing illuminance of a peripheral portion of the flash lens 200 compared to a center portion of the flash lens 200.

The pattern 260 may have a plurality of basic shapes formed repeatedly. As illustrated in FIG. 2A, a cross section of a basic shape has a semicircular shape, but the present invention is not limited thereto, and the basic shape may have any of various shapes. That is, the cross section of the basic shape for forming the pattern 260 may have a polygonal shape, such as a triangle, a quadrangle, or the like, but may have a curve shape, such as a semicircular shape, a sine wave shape, or the like. Also, the pattern 260 may be formed of a plurality of basic shapes having the same size. That is, the cross section of the pattern 260 may have a shape in which semicircular shapes having the same size are regularly arranged.

Referring to FIG. 2B, the lens unit has a circular shape. That is, the first incident surface 220, the light-emitting surface 240, and the like may be formed in a circular shape. However, the present invention is not limited thereto. In addition, the lens seating portion 250, in the view taken along the arrow direction illustrated in FIG. 2A, has a square shape, but the present invention is not limited thereto, and the lens seating portion 250 may have a quadrangle shape, such as a rectangular shape, a polygonal shape, a circular shape, an oval shape, or the like. A plane of the pattern 260 formed in the lens seating portion 250 may have a shape in which a plurality of concentric circles are regularly arranged, that is, a shape in which a plurality of circles are arranged around the lens unit so as to become larger at a predetermined ratio.

In addition, in the lens seating portion 250 having a square shape as illustrated in FIG. 2B, the pattern 260 may have a shape in which a plurality of arcs, as parts of cut-off concentric circles, are regularly arranged.

Figure 3A:
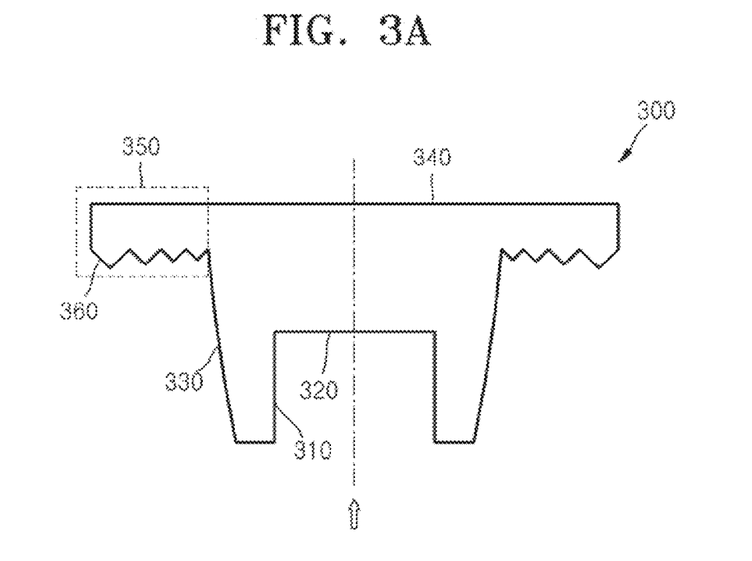
FIG. 3A is a schematic cross-sectional view illustrating a flash lens according to another embodiment of the present invention.
Figure 3B:
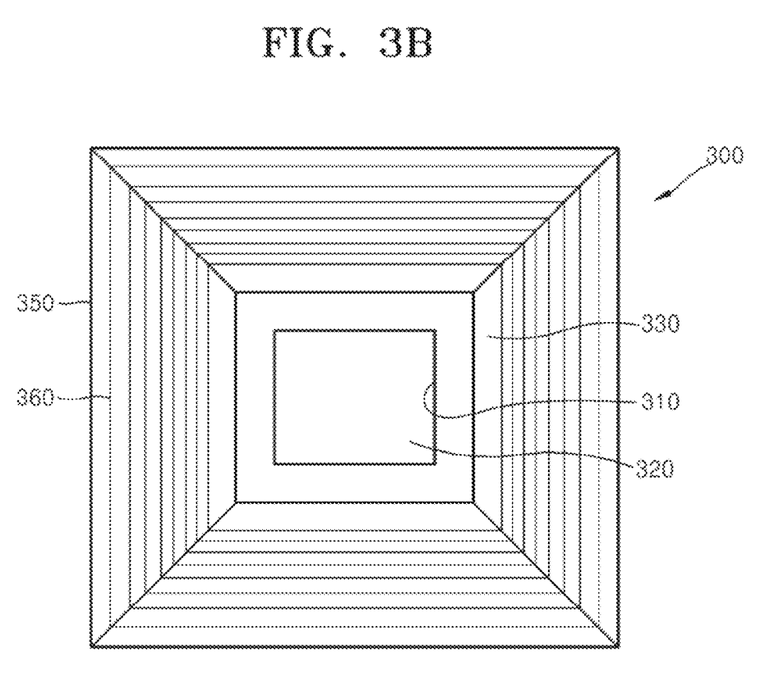
FIG. 3B is a plane view thereof.

FIG. 3A is a schematic cross-sectional view illustrating a flash lens 300, according to another embodiment of the present invention, and FIG. 3B is a plane view thereof taken along an arrow direction of FIG. 3A. Hereinafter, differences between the flash lens 300 of FIGS. 3A and 3B and the flash lens 100 and 200 will be mainly described.

Referring to FIG. 3A, the flash lens 300 of the current embodiment may include a lens unit including first and second incident surfaces 320 and 310, a reflecting surface 330, and a light-emitting surface 340, and a lens seating portion 350 disposed at a lower portion of an edge of the light-emitting surface 340, extending and protruding from the reflecting surface 330, and including a pattern 360 formed in a lower surface thereof. The first and second incident surfaces 320 and 310, the reflecting surface 330, and the light-emitting surface 340 included in the lens unit are respectively as those described in the embodiment with regard to FIGS. 1A and 1B.

The lens seating portion 350 may be disposed at the lower portion of the edge of the light-emitting surface 340, and may extend and protrude from the reflecting surface 330. The pattern 360 may be formed in the lower surface of the lens seating portion 350 and may reflect light incident on the lens seating portion 350 toward the light-emitting surface 340, thereby preventing light from being lost in a conventional lens seating portion of a flash lens not having a frame and increasing illuminance of a peripheral portion of the flash lens 300 compared to a center portion of the flash lens 300. The pattern 360 may have a plurality of basic shapes formed repeatedly. As illustrated in FIG. 3A, a cross section of the basic shape has a triangular shape, but the present invention is not limited thereto, and the basic shape may have any of various shapes. That is, the cross section of the basic shape for forming the pattern 360 may have a polygonal shape, such as a triangle, a quadrangle, or the like, but may have a curve shape, such as a semicircular shape, a sine wave shape, or the like.

Unlike FIGS. 1A, 1B, 2A, and 2B as described above, the plurality of basic shapes do not have the same size, and as illustrated in FIG. 3A, as the distance between the basic shape and the reflecting surface 330 increases, the basic shape may become larger. That is, a cross section of the lens seating portion 350 may have a shape in which triangles regularly arranged become larger outward. Unlike FIG. 3A, as the distance between the basic shape and the reflecting surface 330 increases, the cross section of the basic shape may be smaller.

Referring to FIG. 3B, the lens unit has a rectangular shape. That is, the first incident surface 320, the light-emitting surface 340, and the like may be formed in a rectangular shape. However, the present invention is not limited thereto. In addition, the lens seating portion 350, in the view taken along the arrow direction illustrated in FIG. 3A, may have a rectangular shape, but the present invention is not limited thereto, and the lens seating portion 350 may have any of various forms. A plane of the pattern 360 formed in the lens seating portion 350 may have a shape in which a plurality of rectangles are arranged around the lens unit, wherein as the distance between the lens unit and the pattern 360 increases, a rectangle becomes larger. That is, as the distance between the lens unit and the pattern 360 increases, an interval between the patterns 360 may be increased. Also, diagonals formed in the lens seating portion 350 having a rectangular shape may have a shape in which junctions of horizontal basic shapes and vertical basic shapes are bent. The diagonals may be shown as single lines in FIG. 3B.

Figure 4A:
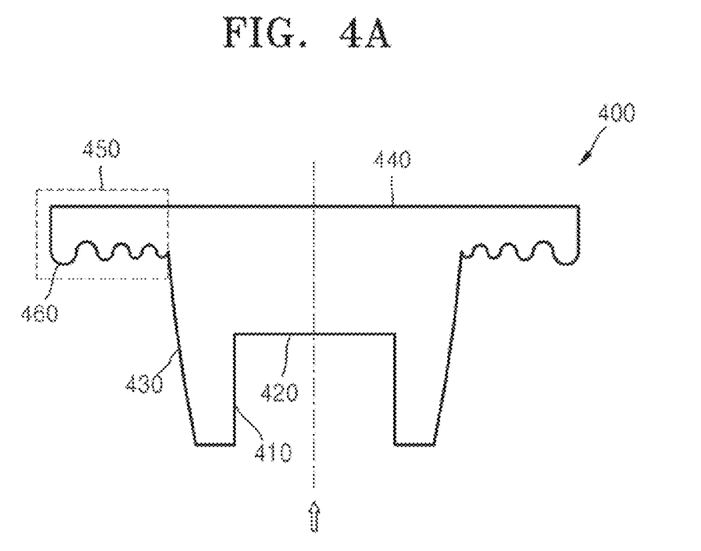
FIG. 4A is a schematic cross-sectional view illustrating a flash lens according to another embodiment of the present invention.
Figure 4B:
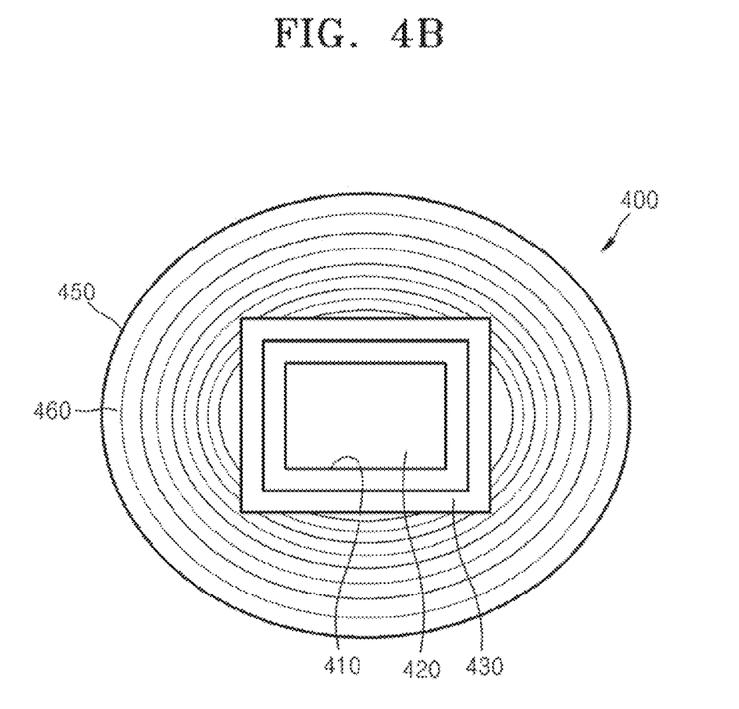
FIG. 4B is a plane view thereof.

FIG. 4A is a schematic cross-sectional view illustrating a flash lens 400, according to another embodiment of the present invention, and FIG. 4B is a plane view thereof taken along an arrow direction of FIG. 4A. Hereinafter, differences between the flash lens 400 of FIGS. 4A and 4B and the flash lens 100, 200, and 300 will be mainly described.

Referring to FIG. 4A, the flash lens 400 of the current embodiment may include a lens unit including first and second incident surfaces 420 and 410, a reflecting surface 430, and a light-emitting surface 440, and a lens seating portion 450 disposed at a lower portion of an edge of the light-emitting surface 440, extending and protruding from the reflecting surface 430, and including a pattern 460 formed in a lower surface thereof. The first and second incident surfaces 420 and 410, the reflecting surface 430, and the light-emitting surface 440 included in the lens unit are respectively as those described in the embodiment with regard to FIGS. 1A and 1B.

The lens seating portion 450 may be disposed at the lower portion of the edge of the light-emitting surface 440, and may extend and protrude from the reflecting surface 430. The pattern 460 may be formed in the lower surface of the lens seating portion 450 and may reflect light incident on the lens seating portion 450 toward the light-emitting surface 440, thereby preventing light from being lost in a conventional lens seating portion of a flash lens not having a frame and increasing illuminance of a peripheral portion of the flash lens 400 compared to a center portion of the flash lens 400.

The pattern 460 may be formed by repeatedly forming a plurality of basic shapes. As illustrated in FIG. 4A, a cross section of a basic shape has a semicircular shape, but the present invention is not limited thereto, and the basic shape may have any of various shapes. That is, the cross section of the basic shape for forming the pattern 460 may have a polygonal shape, such as a triangle, a quadrangle, or the like, but may have a semicircular shape, a sine wave shape, or the like. In addition, as illustrated in FIG. 4A, as the distance between the basic shape and the reflecting surface 430 increases, the basic shape may become larger. That is, a cross section of the lens seating portion 450 may have a shape in which semicircles regularly arranged become larger outward. Also, unlike FIG. 4A, as the distance between the basic form and the reflecting surface 430 increases, the cross section of the basic shape may be smaller.

Referring to FIG. 4B, the lens unit has a rectangular shape. That is, the first incident surface 420, the light-emitting surface 440, and the like may be formed in a rectangular shape. However, the present invention is not limited thereto. In addition, the lens seating portion 450, in the view taken along the arrow direction illustrated in FIG. 4A, may have an oval shape, but the present invention is not limited thereto, and the lens seating portion 450 may have any of various forms. A plane of the pattern 460 formed in the lens seating portion 450 may have a shape in which a plurality of ovals are arranged around the lens unit, wherein as the distance between the lens unit and the pattern 460 increases, the oval becomes larger. That is, as the distance between the lens unit and the pattern 460 increases, the flash lens 400 may have a shape a plurality of ovals having an increasingly long axis and an increasingly short axis are regularly arranged. Also, a part of the pattern 460 adjacent to the lens unit may be omitted due to the lens unit.

Figure 5A:
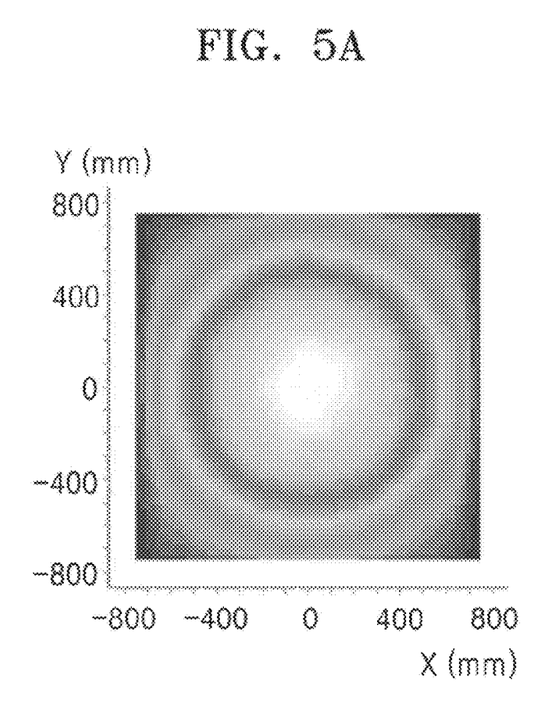
FIGS. 5A and 5B are charts illustrating illuminance of a flash lens according to an embodiment of the present invention.
Figure 5B:
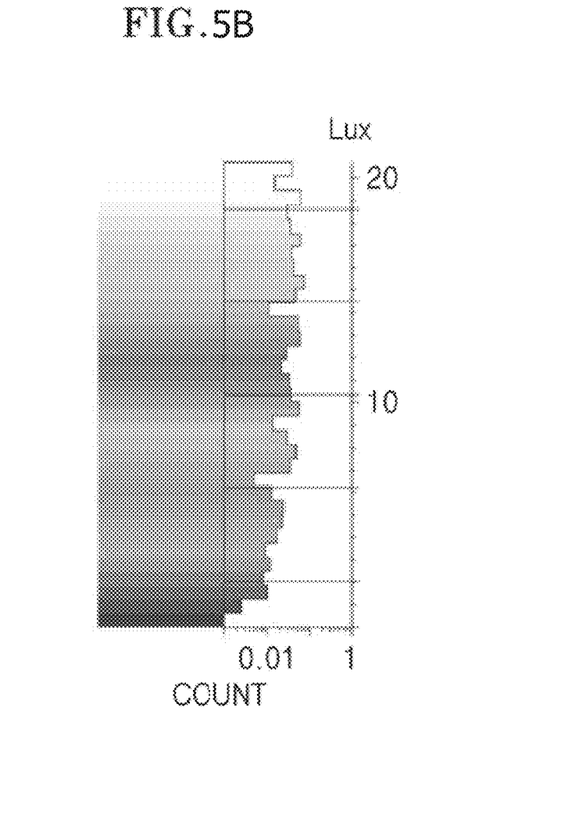

FIGS. 5A and 5B are charts illustrating illuminance of the flash lens 100 according to an embodiment of the present invention. FIG. 5A illustrates illuminance of the flash lens 100 in an x-y plane about one meter away from the flash lens 100, and FIG. 5B illustrates distribution of the illuminance of the flash lens 100 illustrated in FIG. 5A. That is, FIG. 5B illustrates ratios of each illuminances shown in FIG. 5A and the ratios are determined by dividing the region illustrated in FIG. 5A into a plurality of cells, counting a number of cells having a specific illuminance, and calculating each ratio of the number of cells having the specific illuminance to the number of total cells. Colors corresponding 32 illuminances of the light emitted by the flash lens 100 are illustrated on the left side in FIG. 5B, and distribution of the illuminances of light emitted through the flash lens 100 is illustrated on the right side of FIG. 5B. Referring to FIGS. 5A and 5B, illuminance uniformity of the flash lens 100 of the current embodiment is about 68.5%. Accordingly, it is seen that the illuminance uniformity of the flash lens 100 of the current embodiment is increased by about 3.5%, compared to illuminance uniformity of about 65% of a conventional lens seating portion not including a pattern. In this regard, the illuminance uniformity refers to a ratio of illuminance of a peripheral portion with respect to illuminance of a center portion at a position about one meter away from a flash lens. A low illuminance uniformity means that illuminance of a peripheral portion is low compared to that of a center portion, and during photographing, an edge portion of an image may appear dark. Accordingly, in order for the overall brightness of an image to appear similarly, illuminance uniformity of a flash module needs to be high. In the flash lens 100 of the current embodiment, illuminance uniformity is increased compared to a conventional flash lens, and thus, uniform flash light may be provided to a peripheral region outside a region corresponding to a center region of the flash lens during photographing. The flash lenses 200, 300, and 400 according to the other embodiments may also realize increased illuminance uniformity, compared to a conventional flash lens, as the illuminance uniformity illustrated in FIGS. 5A and 5B.

Figure 6:
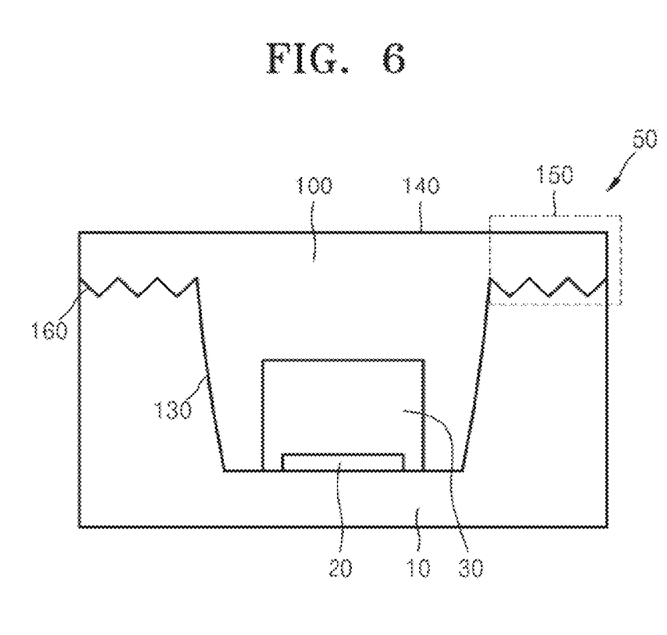
FIG. 6 is a schematic cross-sectional view illustrating a flash module according to an embodiment of the present invention.

FIG. 6 is a schematic cross-sectional view illustrating a flash module 50 according to an embodiment of the present invention.

Referring to FIG. 6, the flash module 50 of the current embodiment may include a light emitting diode (LED) chip 20, a housing 10 on which the LED chip 20 is disposed, and the flash lens 100 seated on the housing 10. The flash module 50 may further include a phosphor layer 30 between the LED chip 20 and the flash lens 100, and may include the flash lenses 200, 300, and 400 according to the other embodiments.

In the flash module 50 of the current embodiment, the pattern 160 is formed in the lower surface of the lens seating portion 150. The pattern 160 may reflect light incident on the lens seating portion 150 toward the light-emitting surface 140 so as to prevent light from being lost in the lens seating portion 150. Therefore, illuminance uniformity, which refers to a ratio of illuminance of a peripheral portion of the flash module 50 with respect to illuminance of a center portion of the flash module 50, may be increased compared to a conventional flash module including a lens seating portion not having a pattern.

In addition, the flash module 50 may be integrally formed with the flash lens 100 so as to reduce change in illuminance of light due to an assembly tolerance. That is, the flash module 50 may be manufactured by using the following method. First, a pattern corresponding to the pattern 160 of the lens seating portion 150 is formed in a lower frame in which a plurality of the housings 10 are installed each on which the LED chip 20 is mounted, and then a silicon resin is injected into the pattern. Then, an upper frame is coupled to the lower frame, and the silicon resin is hardened, and thus, the flash lens 100 may be integrally formed on the housing 10. Also, the flash lens 100 may be formed by insert-molding silicon having a low hardness without using a frame, thereby reducing a manufacturing cost of the frame and simplifying a manufacturing process.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A flash lens comprising:
a lens unit comprising an incident surface, a reflecting surface, and a light-emitting surface; and
a lens seating portion arranged on an outermost peripheral portion of the lens unit, and including a pattern formed in a lower surface thereof, the pattern reflecting light incident on the lens seating portion toward the light-emitting surface,
wherein the pattern extends to an outer edge of the outermost peripheral portion.

2. The flash lens of claim 1, wherein at least a portion of the light incident on the lens seating portion is light transmitting through the reflecting surface.

3. The flash lens of claim 1, wherein at least a portion of the light incident on the lens seating portion is from the light-emitting surface by reflection.

4. The flash lens of claim 1, wherein the pattern is configured to prevent light from being lost in the lens seating portion.

5. The flash lens of claim 1, wherein the pattern is configured to increase illuminance uniformity of the flash lens compared to a case where the pattern does not exist.

6. The flash lens of claim 1, wherein the lens seating portion protrudes and extends out from the reflecting surface.

7. The flash lens of claim 1, wherein an upper surface of the lens seating portion is coplanar with the light-emitting surface.

8. The flash lens of claim 1, wherein the incident surface comprises a first incident surface that is parallel with the light-emitting surface and a second incident surface that is not parallel with the light-emitting surface.

9. The flash lens of claim 8, wherein the level of the lower surface of the lens seating portion is located to be higher than the level of the first incident surface.

10. The flash lens of claim 8, wherein the second incident surface is substantially vertical to the light-emitting surface.

11. A flash module comprising:
   the flash lens of claim 1; and
   a light emitting diode (LED) chip integrally formed with the flash lens.

12. The flash module of claim 11, wherein at least a portion of the light emitted by the LED is reflected by the pattern to pass through the lens seating portion toward outside.

* * * * *